UNITED STATES PATENT OFFICE.

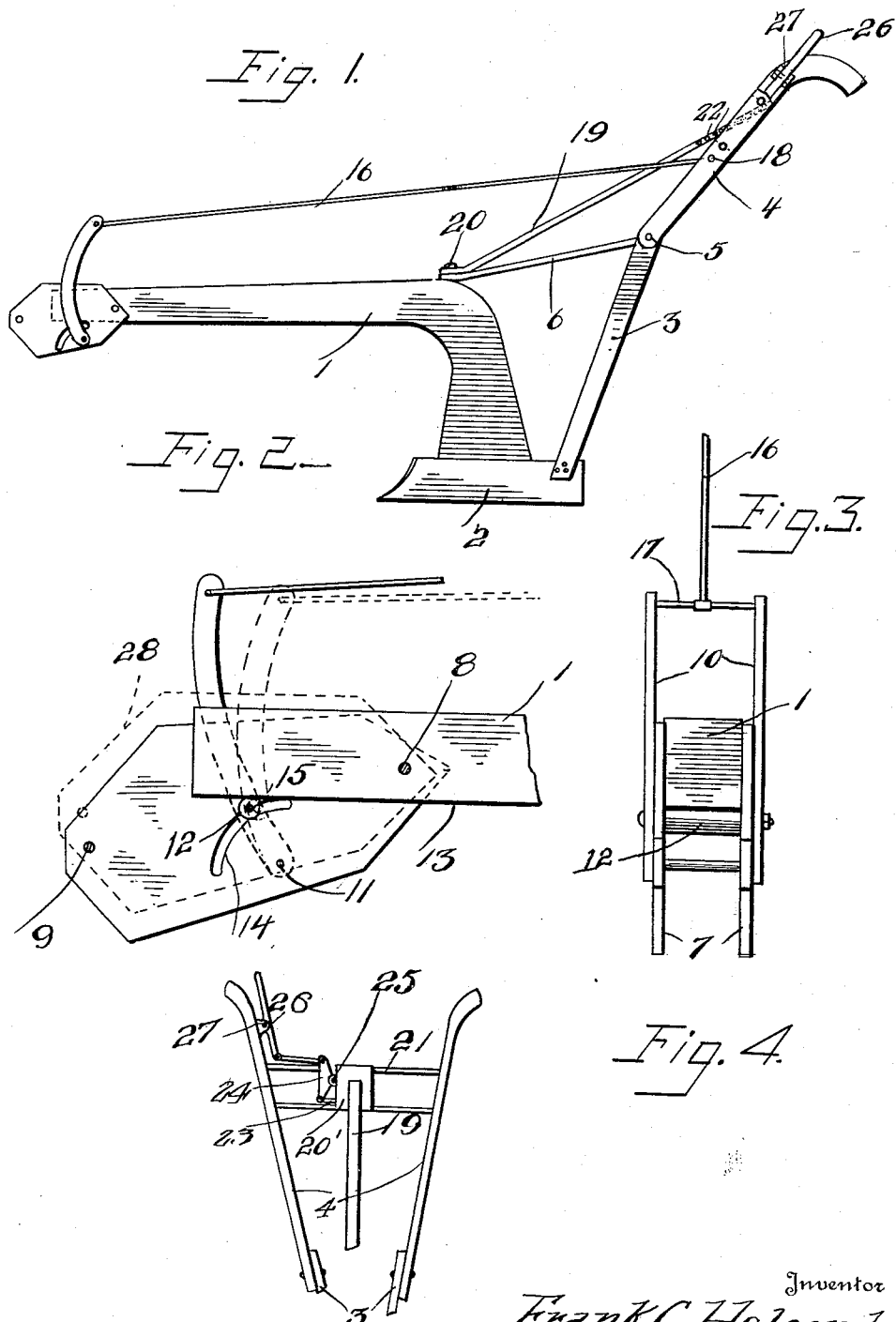

FRANK G. HOLCOMB, OF FRANKLIN, KENTUCKY.

CLEVIS ATTACHMENT FOR PLOWS.

1,220,225.   Specification of Letters Patent.   Patented Mar. 27, 1917.

Application filed April 22, 1916. Serial No. 92,951.

*To all whom it may concern:*

Be it known that I, FRANK G. HOLCOMB, a citizen of the United States, residing at Franklin, in the county of Simpson and State of Kentucky, have invented certain new and useful Improvements in Clevis Attachments for Plows, of which the following is a specification.

The present invention relates to new and useful improvements in clevis attachments for plows and more particularly to means for raising and lowering the clevis from the rear end of a plow when in operation, the object being to facilitate the operation of the plow, permitting the same to negotiate obstructions and the like if the same be encountered during a plowing operation.

An object of my invention is to provide a clevis attachment of the class described which may be easily and quickly applied to the existing types of plows without materially altering the plow structure.

Other objects and advantages to be derived from the use of my improved plow clevis will appear from the following detailed description and the claims taken with an inspection of the accompanying drawings, in which:—

Figure 1 is a side elevation of the plow having my improved clevis and the mechanism therefor applied thereto.

Fig. 2 is an enlarged fragmental side elevational view of the free end of the plow beam showing my improved clevis applied thereto, one side of the clevis member being removed.

Fig. 3 is an end elevational view of a plow beam having my improved clevis attached thereto; and Fig. 4 is a fragmental front elevational view of the adjusting mechanism for use in connection with my improved clevis.

Referring more particularly to the drawings, wherein similar characters of reference designate like and corresponding parts throughout the various views, 1 designates the conventional form of plow beam having the shaft 2 carried by the rear end portion thereof. I provide supporting arms 3 extending upwardly from the plow beam, said arms having the plow handles 4 pivoted thereon as indicated at 5. Suitable brace rods 6 may be provided extending from the plow beam 1 to the upper free ends of the arms 3 for an obvious purpose.

Referring to Figs. 2 and 3 wherein the improved clevis of my invention is best shown, I provide spaced plates pivotally mounted as at 8 on the sides of the plow beam 1. The outer free ends of the plates 7 are connected by means of a transversely extending rod 9 or the like to which may be connected a draft-animal.

The operating members for the clevis comprise a pair of arcuate levers 10 arranged outside the plates 7 and the plow beam 1 and pivoted as at 11 to said plates. An anti-friction roller 12 is carried by the levers 10 and is adapted to bear upon the under face 13 of the plow beam 1. The plates 7 are provided with arcuate slots 14 to accommodate the free ends of the shaft 15 on which the anti-friction roller 12 is mounted.

I provide means for swinging the levers 10 forwardly or rearwardly as the case may be for altering the position of the free end of the clevis, said means comprising a connecting rod 16, the free end of which is provided with a transverse rod 17 connected with the upper free ends of the levers 10 as best shown in Fig. 3. The rear end of the rod 16 is connected as at 18 to plow handles 4. It will be seen that when the plow handles are swung forwardly and rearwardly movement will be transmitted to the levers 10 through the rod 16. The adjusting means for the handles 4 comprise a strip 19 mounted at 20 on the top of the plow beam 1 and extending rearwardly to a point between the plow handles 4. The strip 19 extends through a block 20' carried on transverse bars 21, said block having an opening therein to slidably accommodate said strip 19. The strip 19 is provided with a plurality of openings 22, and a slidable bolt 23 carried by the free end of a rock arm 24 mounted at 25 serves to engage in said openings to maintain the handles in adjusted position. A lever 26 pivoted at 27 on one of the handles 4 connects with the rock arm 24 for moving the sliding bolt 23.

From the above description it will be noted that by shifting the plow handles 4 forwardly, the levers 10 will be swung downwardly causing the clevis to become lowered. Upon swinging the plow handles rearwardly, the roller 12 acting on the under face 13 of the plow beam 1 in conjunction with the pivot 11 raises the clevis to the dotted line position designated 28 in Fig. 2. Of course, during the movement of the handles 4, the sliding bolt 23 must be disengaged from the strip 19. It will thus be seen that by altering the position of the clevis, the direction of pull by the draft animals may be used to best advantage in negotiating obstacles and the like.

From the above description taken in connection with the accompanying drawings, it is thought that a clear and comprehensive understanding of the construction, operation and advantages of my invention may be had, and while I have shown and described my invention as embodying a specific structure, I desire that it be understood that I may make such changes in said structure as do not depart from the spirit and scope of the invention as claimed.

Having thus described by invention, what I claim as new and desire to secure by Letters Patent is:—

1. In a clevis attachment for plows, a clevis formed of a pair of spaced plates mounted on opposite sides of a plow beam, a plurality of levers pivoted on said plates, means for shifting said levers, and a roller carried by said levers engageable with the under face of the plow beam to raise and lower said clevis.

2. In combination, a plow beam having a clevis pivotally associated with the forward end thereof, a lever pivoted on said clevis and having an anti-friction roller engageable with the plow beam to alter the position of the clevis, a pair of handles mounted on said plow beam and having connection with said lever, means for adjusting said handles forwardly and rearwardly, whereby to raise and lower said clevis.

3. In combination, a plow beam, a clevis formed of a pair of spaced plates mounted on opposite sides of the plow beam, said plates being provided with arcuate slots, a lever pivoted to said clevis and having a roller member mounted on a shaft for engagement with the under side of the plow beam, the free ends of the shaft being accommodated by the said slots, a pair of handles mounted on said plow beam and having connection with said lever, means for adjusting said handles to raise and lower said clevis.

4. In combination, a plow beam, a clevis mounted on the forward end thereof, a lever pivotally carried by the said clevis, the beam having a pair of handles pivotally associated therewith, means for adjusting the said handles comprising a strip member, having one end mounted on the top of said beam, the other end thereof being provided with apertures and slidably mounted in a block member mounted on a transverse bar extending between the plow handles, a lever provided with a rock arm adapted to operate a sliding bolt into engagement with said apertures to maintain the handles in adjusted positions.

In testimony whereof, I affix my signature hereto.

FRANK G. HOLCOMB.

Copies of this patent may be obtained for five cents each, by addressing the "Commissioner of Patents, Washington, D. C."